Patented Apr. 22, 1924.

1,491,313

UNITED STATES PATENT OFFICE.

PAUL REHLÄNDER, OF BERLIN-CHARLOTTENBURG, GERMANY.

COMPOUND FOR MAKING PHOTOGRAPHIC TONING BATHS.

No Drawing.     Application filed February 6, 1923. Serial No. 617,390.

*To all whom it may concern:*

Be it known that I, PAUL REHLÄNDER, citizen of Germany, residing at Berlin-Charlottenburg, Germany, have invented certain new and useful Improvements in Compounds for Making Photographic Toning Baths, of which the following is a specification.

This invention relates to compounds for making photographic toning baths, more especially toning baths containing selenium by which black silver prints are tinted brown. It has already been proposed for this purpose to use solutions of sodium selenosulfate and sodium sulfite, but as sodium selenosulfate cannot be prepared in solid state, it can only be put on sale in form of solutions which are difficult to store and to ship.

In my pending patent application Ser. No. 562,811 I propose for the purpose in question to use mixtures of solid potassium selenosulfate, rubidium selenosulfate or cæsium selenosulfate with potassium sulfite. Such mixtures dissolve without decomposition but are objectionable in that they are hygroscopic and are decomposed by the carbon dioxide of the air.

More serviceable is the mixed salt sodium selenosulfate+sodium thiosulphate as proposed in my above mentioned patent application, but this mixed salt can only be prepared with a proportion of 3 per cent of selenium at the highest which percentage is not sufficient for practical purposes.

The object of my present invention is to provide a selenium compound for making photographic toning baths which is absolutely stable against the influences of moisture and carbon dioxide contained in the air and which therefore can easily be stored, shipped and preserved. I have found that a mixed or compound salt consisting of potassium selenosulfate and potassium thiosulfate, crystallized together in the proportion of at least ½ molecule of potassium thiosulfate to one molecule of potassium selenosulfate is adapted to meet all aforesaid requirements. This mixed or compound salt can contain about 12 per cent of selenium and is absolutely stable against atmospheric influences. It can easily be obtained in one of the following ways:—

1. 60 grams of potassium bisulfite are dissolved in 100 grams of water, then such a quantity of potassium hydroxide or potassium carbonate is added that phenolphthalein paper is colored violet. Thereupon I add 36.8 grams selenium and boil for some hours until all selenium is dissolved. Now I add 250 grams of potassium thiosulfate and evaporate until crystallization begins. White crystals are obtained which are the mixed salt of potassium selenosulfate+potassium thiosulfate. They contain about 12 per cent of selenium.

2. 82 grams of dry potassium sulfite are dissolved in 200 c. cm. of water and the solution is boiled for some hours with 18 grams selenium and 7 grams sulfur until selenium and sulfur are dissolved. Then I evaporate until crystallization begins. On cooling crystals are obtained which are the above-described salt of potassium selenosulfate+potassium thiosulfate.

To obtain a toning bath for photographic silver prints I dissolve dry sodium sulfite (500 grams) in water (5 liters), add the above described salt of potassium selenosulfate+potassium thiosulfate (500 grams), dissolve the same and mix with a 20 per cent solution of sodium thiosulfate (30 liters). Or I thoroughly mix the above-mentioned salt of potassium selenosulfate+potassium thiosulfate (10 grams) with sodium sulfite (10 grams) and dissolve this mixture in a 20 per cent solution of sodium thiosulfate (500 c. cm.).

I claim:—

The herein described compound for making photographic toning baths consisting of at least ½ molecule of potassium thiosulfate to one molecule of potassium selenosulfate crystallized together.

In testimony whereof I affix my signature in presence of a witness.

DR. PAUL REHLÄNDER.

Witness:
    E. HOLZERMAN.